United States Patent [19]

Nagatsu

[11] Patent Number: 5,280,515
[45] Date of Patent: Jan. 18, 1994

[54] FAULT PROCESSING SYSTEM FOR PROCESSING FAULTS OF PRODUCING POINTS

[75] Inventor: Mamoru Nagatsu, Plano, Tex.

[73] Assignee: Fujitsu Limited, Kawasaki, Japan

[21] Appl. No.: 728,888

[22] Filed: Jul. 10, 1991

[30] Foreign Application Priority Data

Jul. 10, 1990 [JP] Japan .................. 2-182464

[51] Int. Cl.⁵ .......................... H04M 11/00
[52] U.S. Cl. ..................... 379/53; 395/575
[58] Field of Search ............. 379/102, 104, 105, 106, 379/107, 39, 53, 54, 40, 42; 395/575

[56] References Cited

U.S. PATENT DOCUMENTS

| | | |
|---|---|---|
| 4,321,666 | 3/1982 | Tasar et al. |
| 4,626,992 | 12/1986 | Greaves et al. ............ 379/40 |
| 4,652,859 | 3/1987 | Van Wienen ............... 379/40 |
| 4,847,894 | 7/1989 | Chanvin et al. ........... 379/104 |
| 4,856,047 | 8/1989 | Saunders .................. 379/40 |
| 4,922,514 | 5/1990 | Bergeron et al. ............ 379/40 |
| 4,996,703 | 2/1991 | Gray ..................... 379/106 |
| 5,061,916 | 10/1991 | French et al. ............ 379/106 |

FOREIGN PATENT DOCUMENTS

WO890795 8/1989 European Pat. Off.
274252 11/1988 Japan.

*Primary Examiner*—Jin F. Ng
*Assistant Examiner*—Stella L. Woo

[57] ABSTRACT

A fault processing system processes a fault which is generated in one or a plurality of producing points which design and produce products according to orders received from customers. The fault processing system includes a first producing point which is used as a center producing point, second producing points, and one or a plurality of communication networks coupling the first and second producing points. Each of the second producing points comprise a first device for detecting a fault generated in a program module of the second producing point and a second device for notifying the fault and information identifying program module in which the fault is generated to the first producing point responsive to the first device. The first producing point comprises a third device for analyzing the fault notified from the second producing point depending on whether the program module in which the fault is generated is a common program module or a particular program module based on the information. The common program module is used in common at a plurality of second producing points, and the particular program module is used exclusively in the second producing point to which the particular program module belongs.

8 Claims, 6 Drawing Sheets

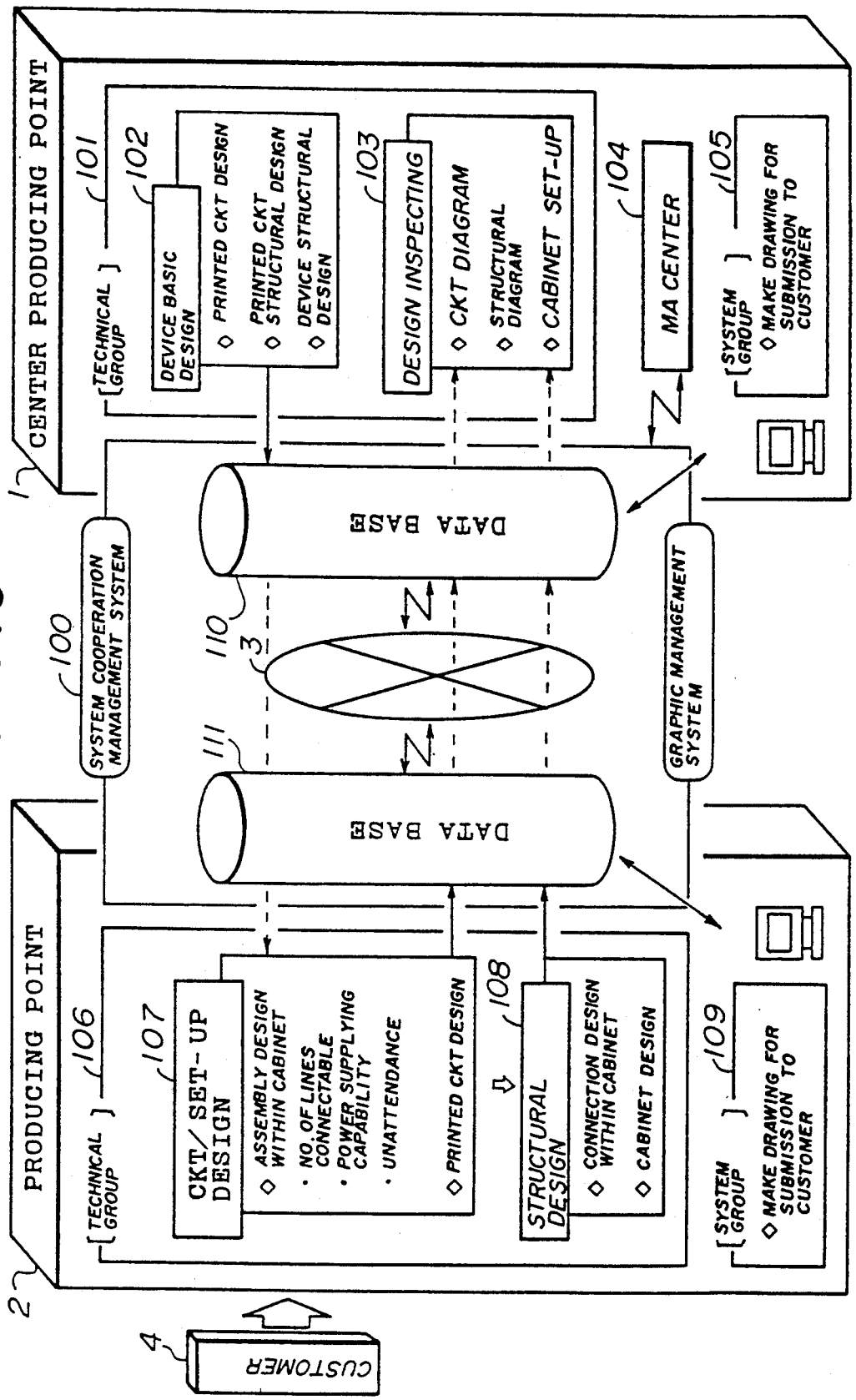

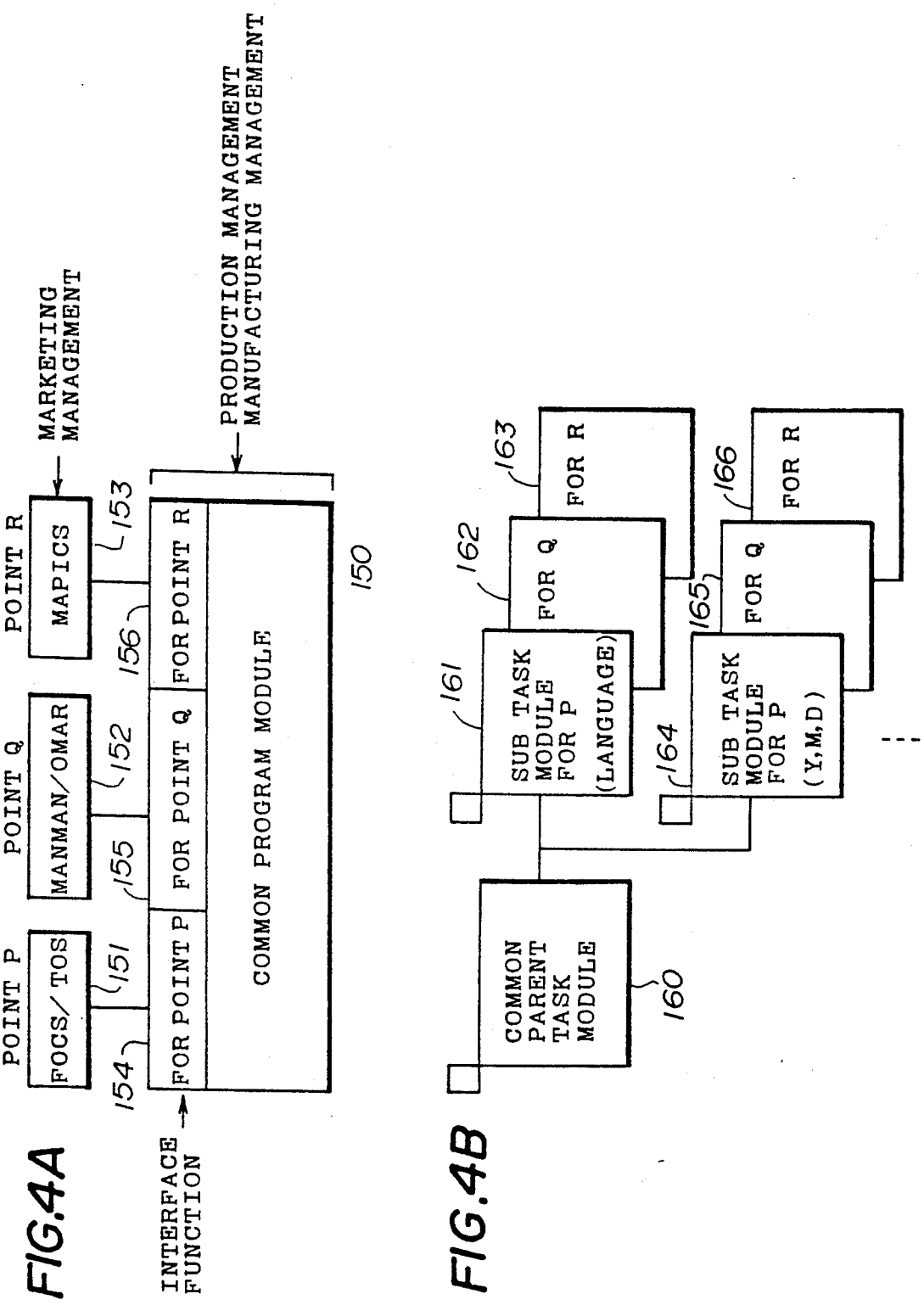

FIG.5A

SOURCE PROGRAM STRUCTURE (ON-LINE)

```
DATA DIVISION.
WORKING-STORAGE SECTION
01 CONTACT REGION COPY CONTACT AREA.
        ⌇
PROCEDURE DIVISION.
        ⌇
* CALL'PARTICULAR MODULE' USING CONTACT REGION.
* IF FAULT FG='ON' THEN
*    MOVE'MODULE NAME' TO MODULE NAME OF CONTACT
     REGION
*
*    GO TO FAULT.
        ⌇
FAULT.
   CALL'FAULT MODULE' USING CONTACT REGION
        ⌇
```

FIG.5B

BATCH JOB STREAM AND BATCH PROGRAM STRUCTURE

```
// JOB BATCH1........
// PG1 EXEC PGM=PG1
// ABEND DSN= && ABEND.....
      ⌇
      ⌇
      ⌇
// LAST EXEC PGM=FAULT NOTIFICATION
// ABEND DSN=&& ABEND......
```

FAULT PROCESSING SYSTEM FOR PROCESSING FAULTS OF PRODUCING POINTS

BACKGROUND OF THE INVENTION

The present invention generally relates to fault processing systems, and more particularly to a fault processing system for carrying out centralized or decentralized management of software faults which are generated at a plurality of producing points which produce and market products according to orders placed by customers.

Recently, there is a tendency for the producing points to become dispersed to distant locations including overseas locations. Under this situation, each program module which operates at the producing point may be particular to the location of the producing point or may be used in common among a plurality of producing points. For this reason, when coping with the software fault, it is necessary to correctly judge the type of program module before actually taking a countermeasure.

The contents of the program modules may have subtle differences among the dispersed producing points due to differences in the language, custom and the like of the regions in which the producing points are located. For this reason, the countermeasure against the software fault which is generated at a producing point is conventionally taken in that producing point. In other words, each producing point individually takes the countermeasure against the software fault which is generated therein.

Even when the producing points are dispersed, the program modules corresponding to the production management structure and the manufacturing management structure, for example, are in many cases used in common among the producing points. The programs modules are used in common among the producing points particularly when the producing points produce the same kind of products. However, the program modules corresponding to the marketing management structure are in many cases modified at each producing point to suit the region in which the producing point is located.

In the case of the program modules which are used in common among the producing points, a fault in such program modules is a common problem to the producing points. For this reason, a common countermeasure must be taken against such a fault. On the other hand, in the case of the program modules which are particular to the corresponding producing points, a fault in such program modules must be dealt with independently at each producing point. Therefore, when coping with the software fault, there is a demand to correctly judge the type of program module and to take an appropriate countermeasure depending on the judgement result.

SUMMARY OF THE INVENTION

Accordingly, it is a general object of the present invention to provide a novel and useful fault processing system in which the demand described above is satisfied.

Another and more specific object of the present invention is to provide a fault processing system for processing a fault which is generated in one or a plurality of producing points which design and produce products according to orders received from customers, comprising a first producing point which is used as a center producing point, second producing points, and one or a plurality of communication networks coupling the first and second producing points, where each of the second producing points comprise first means for detecting a fault generated in a program module of the second producing point and second means, coupled to the communication network, for notifying the fault and information identifying program module in which the fault is generated to the first producing point responsive to the first means, and the first producing point comprises third means, coupled to the communication network, for analyzing the fault notified from the second producing point depending on whether the program module in which the fault is generated is a common program module or a particular program module based on the information. The common program module is used in common at a plurality of second producing points, and the peculiar program module is used exclusively in the second producing point to which the particular program module belongs. According to the fault processing system of the present invention, it is possible to sort and devise the countermeasures for the faults at the center producing point depending on whether the faults are generated in a common program module or a particular program module. Hence, the software faults generated in all of the producing points can be grasped accurately and centrally at the center producing point.

Other objects and further features of the present invention will be apparent from the following detailed description when read in conjunction with the accompanying drawings.

BRIEF DESCRIPTION OF THE DRAWINGS

FIG. 3 is a block diagram showing a technical management structure employed in the embodiment;

FIGS. 4A and 4B respectively are diagrams for explaining hierarchical structures of program modules;

FIGS. 5A and 5B respectively are diagrams showing embodiments of the program modules.

DESCRIPTION OF THE PREFERRED EMBODIMENTS

Figure 1:
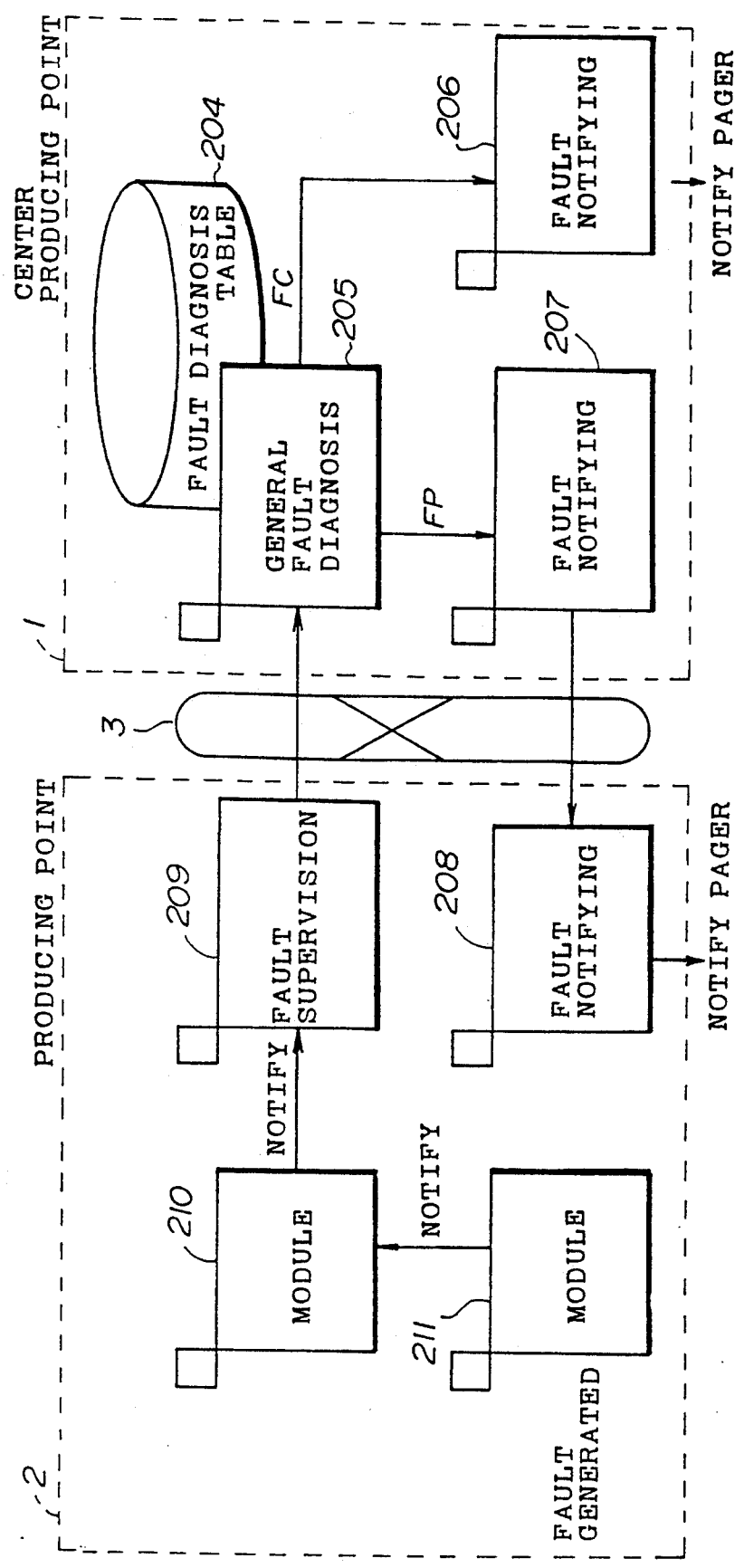
FIG. 1 is a system block diagram for explaining an operating principle of a fault processing system according to the present invention.

First, a description will be given of an operating principle of the fault processing system according to the present invention, by referring to FIG. 1. In FIG. 1, a center producing point 1 is coupled to a plurality of producing points 2 (only one shown) via one or a plurality of data transmission networks 3.

The center producing point 1 includes a fault diagnosis table 204, a general fault diagnosis structure 205, and fault notifying structures 206 and 207. On the other hand, the producing point 2 includes a fault notifying structure 208, a fault supervision structure 209, and program modules 210 and 211.

The fault diagnosis table 204 includes with respect to each program module, (i) the module name, (ii) the summary of the module, (iii) the module classification, (iv) the operating point code and the like. The module classification specifies whether the module operates in common with other producing points 2 or is particular to a producing point 2. The operating point code specifies the producing point 2 where the module is operating.

The general fault diagnosis structure 205 sorts the faults transmitted from the producing points 2 depending on the contents of the faults, into faults which must be dealt with in common for a plurality of producing points 2 and faults which must be dealt with individually for each producing point 2. The fault notifying structure 206 notifies a pager (a type of pocket bell) with respect to the operator of the center producing point 1. The fault notifying structure 207 notifies the contents of the fault to the particular producing point 2 via the data transmission network 3.

At the particular producing point 2, the fault notifying structure 208 notifies a pager with respect to the operator of the producing point 2. The fault supervision structure 209 notifies the center producing point 1, via the data transmission network 3, of the software fault which generated in the producing point 2 to which the fault supervision structure 209 belongs. The program modules 210 and 211 operate in the producing point 2, and the program module 210 corresponds to a parent or common task while the program module 211 corresponds to a sub or particular task. The program modules 210 and 211 have the function of notifying the generated software fault to a fault supervision program (not shown). This fault supervision program notifies the generated software fault to the fault supervision structure 209.

As described above, the program modules 210 and 211 have the function of notifying the software fault to the fault supervision program when the software fault is generated, and the fault supervision program notifies the software fault to the fault supervision structure 209. This fault supervision program notifies to the fault supervision structure 209 the generation of the fault, the module name of the program module in which the fault is generated, the situation in which the fault is generated and the like. The situation is notified from the fault supervision structure 209 to the center producing point 1 via the data transmission network 3.

The general fault diagnosis structure 205 receives the contents of the faults from the producing points 2, and sorts the faults transmitted from the producing points 2 depending on the contents of the fault diagnosis table 204. The faults are sorted into faults FC which must be dealt with in common for a plurality of producing points 2 and faults FP which must be dealt with individually for each producing point 2. The faults FC are notified to the fault notifying structure 206, while the faults FP are notified to the fault notifying structure 207. The fault notifying structure 206 notifies the pager with respect to the operator of the center producing point 1, and the notified operator analyzes the contents of the fault and notifies the countermeasure to each concerned producing point 2 using the common module. On the other hand, the fault notifying structure 207 notifies the contents of the fault to the particular producing point 2 which uses the peculiar module via the data transmission network 3.

On the other hand, at the particular producing point 2, the fault notifying structure 208 notifies the pager with respect to the operator of the producing point 2 as described above. Hence, the operator of the particular producing point 2 analyzes the contents of the fault and takes the appropriate countermeasure.

Figure 2:
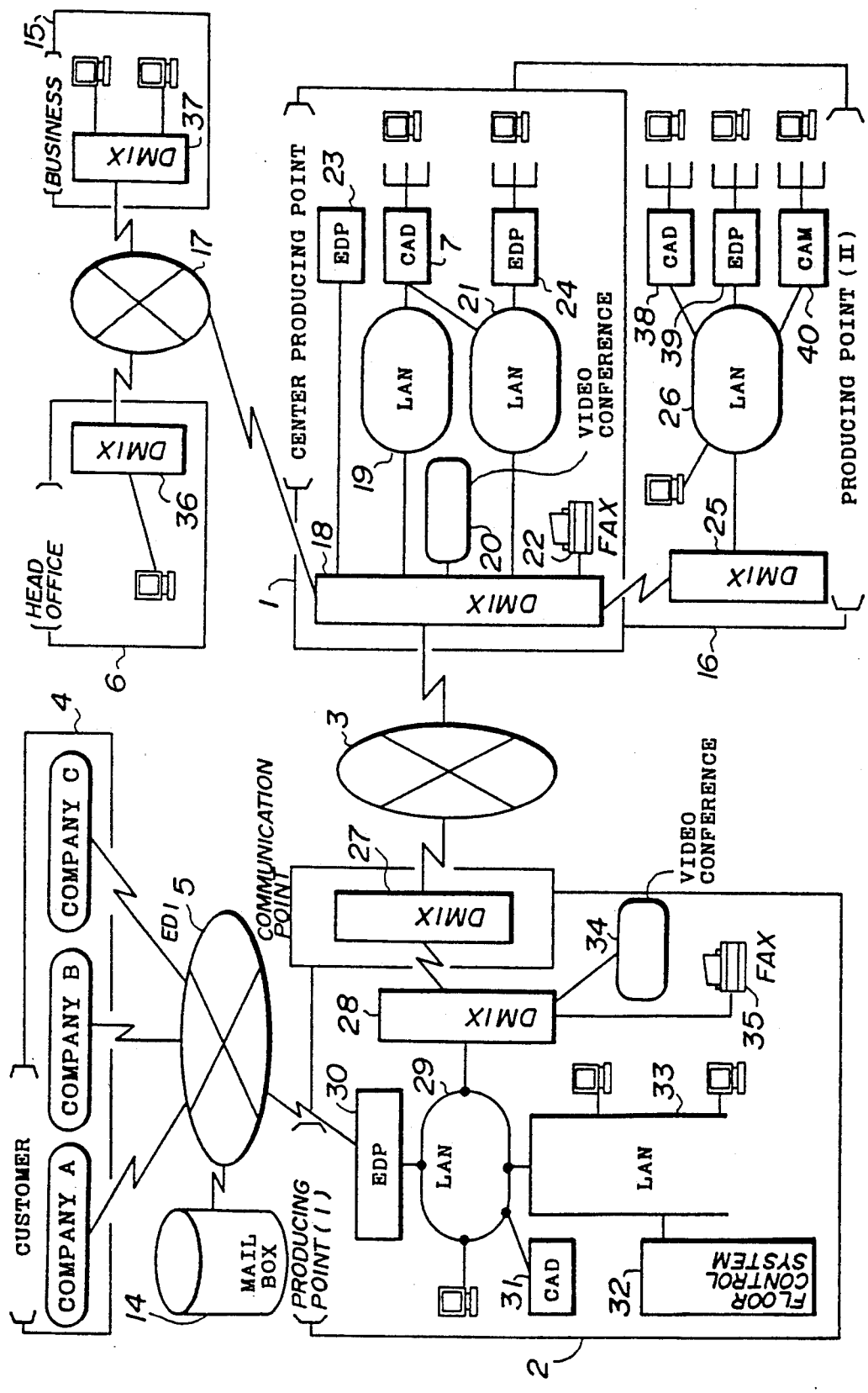
FIG. 2 is a block diagram showing an embodiment of a fault processing system according to the present invention.

Next, a description will be given of an embodiment of the fault processing system according to the present invention, by referring to FIG. 2. In FIG. 2, those parts which are the same as those corresponding parts in FIG.1 are designated by the same reference numerals, and a description thereof will be omitted.

A business office 15 is coupled to the head office business system 6 via an internal network 17. The center producing point 1 is coupled to the producing point 2 (hereinafter also referred to as a producing point (I)) located in a foreign country and to a producing point 16 (hereinafter also referred to as a producing point (II)) located within the home country. The business office 15 includes a transmission/reception equipment 37, and the head office business system 6 includes a transmission/reception equipment 36.

The center producing point 1 includes a transmission/reception equipment 18, optical local area networks (LANs) 19 and 21 which employ optical communication, a video conference equipment 20, a facsimile machine 22, a data processor 23 and 24, and a CAD group 7. The producing point 16 (I) includes a transmission/reception equipment 25, an optical LAN 26, a CAD group 38, a data processor 39 and a CAM group 40. The producing point 2 (I) includes a communication point which includes a transmission/reception equipment 27, a transmission/reception equipment 28, a multi-purpose LAN 29, a data processor 30, a processor 31 for CAD and production management, a floor control system 32, a LAN 33, a video conference system 34 and a facsimile machine 35. For example, the CAD group 7 corresponds to the elements of the center producing point 1 shown in FIG.1, but the data processor 23 may also correspond to the elements of the center producing point 1 shown in FIG.1.

The producing point 2 (I) is coupled to the center producing point 1 via the data transmission network 3. The producing point 16 (II), the head office business system 6 and the business office 15 are coupled to the center producing point 1 via a data transmission line or the internal network 17. The groups within the center producing point 1 are coupled via the optical LANs 19 and 21.

The producing point 2 (I) is coupled to the data transmission network 3 via the transmission/reception equipments 27 and 28. The data processor 30 of the producing point 2 (I) is coupled to the data switching network 5 to which the customers 4 and the mail box 14 are coupled. A high-speed communication is possible among groups within the producing point 2 (I) by use of the multi-purpose LAN 29. The data processor 30 and the processor 31 are coupled to the transmission/reception equipment 29 via the multi-purpose LAN 29, while the floor control system 32 is coupled to the transmission/reception equipment 29 via the LAN 33 and the multi-purpose LAN 29. The video conference system 34 and the facsimile machine 35 are coupled to the transmission/reception equipment 28. For example, the processor 31 corresponds to the elements of the producing point 2 shown in FIG.1, but the floor control system 32 may also correspond to the elements of the producing point 2 shown in FIG. 1.

The producing point 16 (II) is coupled to the center producing point 1 via the transmission/reception equipment 25. The CAD group 38, the data processor 39 and the CAM group 40 are coupled to the transmission/reception equipment 25 via the optical LAN 26.

For example, the data transmission network 3 is formed from two data transmission networks respectively having transmission rates of 768 kbps and 512 kbps. A video conference is made between the producing point 2(I) and the center producing point 1 using the video conference systems 34 and 20 if necessary.

Next, a description will be given of a technical management structure of this embodiment, by referring to FIG. 3. In FIG. 3, those parts which are the same as those corresponding parts in FIG. 1 are designated by the same reference numerals, and a description thereof will be omitted.

In FIG. 3, the center producing point 1 includes a technical group 101, a manufacturing automation (MA) center 104 and a system group 105. The technical group 101 includes a device basic design part 102 and a design inspecting part 103. The producing point 2 includes a technical group 106 and a system group 109. The technical group 106 includes a circuit/set-up design part 107 and a structural design part 108. The circuit/set-up design part 107 designs the circuit, arrangement, shape, size and the like of the product according to the order from the customer 4.

A system cooperation/graphic management system 100 couples the center producing point 1 and the producing point 2. The system cooperation/graphic management system 100 includes design data bases 110 and 111, and the data transmission network 3. Actually, the design data base 110 belongs to the center producing point 1 and the design data base 111 belongs to the producing point 2.

The device basic design part 102 of the center producing point 1 carries out the printed circuit design, the printed circuit structural design, and the device structural design, and stores the result of the basic design into the design data base 110. The result of the basic design is transferred to the design data base of the producing part 2 via the data transmission network 3.

At the producing point 2, the circuit/set-up design part 107 makes the assembly design within the cabinet and the printed circuit design based on the result of the basic design, in correspondence with the order received from the customer 4. The assembly design within the cabinet includes designing (i) the number of lines connectable, (ii) the power supplying capability of the power source, (iii) the unattendance and the like in accordance with the customer's demands. On the other hand, the structural design part 108 makes the connection design within the cabinet and the cabinet design. The cabinet design includes designing the shape, thickness and other dimensions of cabinet.

The design results from the circuit/set-up design part 107 and the structural design part 108 are subjected to the primary inspection which includes a validity check of the design results and then stored in the design data base 111. In addition, the design results are transferred to the design data base 110 of the center producing point 1 via the data transmission network 3.

At the center producing point 1, the design inspection part 103 receives the contents of the design results transferred from the design data base 111, and carries out a collective inspection, that is, a secondary inspection. The secondary inspection includes optimizing the circuit diagram, the set-up diagram, the cabinet structure and the like. The secondary inspection result is notified to the producing point 2. The secondary inspection result may include a product adjusting instruction which instructs adjustment of the product production to the producing point 2. Of course, the producing point 2 produces the products according to the customer's order so as to reflect the secondary inspection result.

During the communication between the producing point 2 and the center producing point 1 described above, the necessary information such as graphic information is transmitted and received between the system group 109 and the system group 105 or the MA center 104.

For example, the primary inspection result may indicate that the product produced at a producing point 2 satisfies the demands of the customer and also conforms to the standards set for the producing point 2. However, even when the primary inspection result of the product produced at the producing point 2 is acceptable, this does not necessarily mean that this product conforms to the universal standards set at the center producing point 1. In other words, when the product produced at the producing point 2 does not conform to the universal standard, this product cannot be used together with a product which is produced at the center producing point 1 to conform to the universal standards. On the other hand, it is difficult from the practical point of view to carry out all the necessary inspections at each producing point 2. For this reason, the primary inspection is made at each producing point 2, and the secondary inspection is only made at the center producing point 1 in response to the primary inspection result from each producing point 2.

The technical management structure is generally described above with reference to FIG. 3. However, the technical management is applicable to the production management structure, the manufacturing management structure and the marketing management structure, and even to the accounting system and the purchasing system. In other words, the problem which is common to each of the producing points 2 is dealt with centrally at the center producing point 1 within a capable range. On the other hand, the problem which is particular to a particular producing point 2 is dealt with at the particular producing point 2 with a degree of freedom such that the center producing point 1 can improve the operation at the particular producing point 2 from the point of view of aptitude and the like.

FIGS. 4A and 4B are diagrams for explaining hierarchical structures of the program modules.

In FIG. 4A, a common program module 150 operates in common at each of the producing points 2. On the other hand, particular program modules 151 through 153 operate at corresponding particular producing points 2. In other words, the particular program module 151, for example, operates at the corresponding particular producing point 2 independently of other program modules of other producing points 2. In FIG. 4A, interface functions are denoted by 154 through 156.

In FIG. 4B, a common parent task (or program) module 160 operates in common at each of the producing points. Sub task (or program) modules 161 through 163 are respectively prepared relative to the parent task module 160 so as to compensate for the difference in language descriptions. Sub task (or program) modules 164 through 166 are also respectively prepared to compensate for the difference in descriptions of year, month and date.

When considering program modules which will operate at each producing point 2, the program modules related to the production management structure and the manufacturing management structure are generally used in common at each of the producing points 2, as shown in FIG. 4A. On the other hand, the program modules related to the marketing management structure, the accounting system and the purchasing system are affected by the differences in trade practice, system and construction, and are in most cases particular to the individual producing points, as indicated by P, Q and R in FIG. 4A. In FIG. 4A, FOCS/TOS, MANMAN/OMAR, and MAPICS are names given to such particular program modules. The interface function 154 is interposed between the common program module 150 and the particular program module 151, the interface function 155 is interposed between the common program module 150 and the particular program module 152, and the interface function 156 is interposed between the common program module 150 and the particular program module 153.

On the other hand, in the case of input/output program modules which are greatly dependent on a man-machine interface which treats images and form sheets, there are differences in the language used in each region and the order with which the year, month and date are indicated in each region. Hence, even if a common parent task module 160 exists as shown in FIG. 4B, sub task modules 161, 162 and 163 exist for the purpose of compensating for the difference in the language used in each region, sub task modules 164, 165 and 166 exist for the purpose of compensating for the difference in the order with which the year, month and date are indicated in each region, and similar sub task modules (not shown) exist for the purpose of compensating for other differences.

In this embodiment, as described above in conjunction with FIG.1, the faults related to the common program module 150 shown in FIG. 4A and the common parent task 160 shown in FIG. 4B are notified to the fault notifying structure 206 of the center producing point 1. On the other hand, the faults related to the particular program modules 151 through 153, the interface functions 154 through 156, and the sub task modules 161 through 166 are mainly notified to the fault notifying structure 208 of the particular producing point 2.

The modules which are referred to as the common program modules have identical source programs. If a partial modification is made in the source program, the common program modules correspond to those parts which includes no modification and are identical. On the other hand, the modules which are referred to as the particular program modules have mutually different source programs, such as the case where the program names are different. If a partial modification is made in the source program, the particular program modules correspond to the modified parts of the source program and the modified parts are always independent sub programs.

FIGS. 5A and 5B show embodiments of the program modules. In this embodiment, a fault which is generated in each program module is notified from the fault supervision structure 209 of the producing point 2 to the center producing point 1 via the data transmission network 3 in FIG. 1. In order to realize this notification, measures are taken in this embodiment so that a fault which is generated in each program module is notified to the fault supervision program and the fault supervision program notifies the fault to the fault supervision structure 209.

FIG. 5A shows the source program structure. In this case, a particular program module is called in correspondence with a certain procedure division, and if a fault flag FG is ON, a "MODULE NAME" is written into a "MODULE NAME OF CONTACT REGION" and a fault supervision module is called, so as to provide a means for notifying the generation of the fault.

FIG. 5B shows the batch stream and batch program structure. In this case, a program PGI is executed relative to a job "BATCH1". If a fault is generated relative to a program module having "&&ABEND" as a certain data set name DSN, descriptions

ABEND DSN = &&ABEND
.
.
.

are made, and at the last line,

ABEND DSN = &&ABEND
.
.
.

are notified to the fault supervision program.

Figure 6:
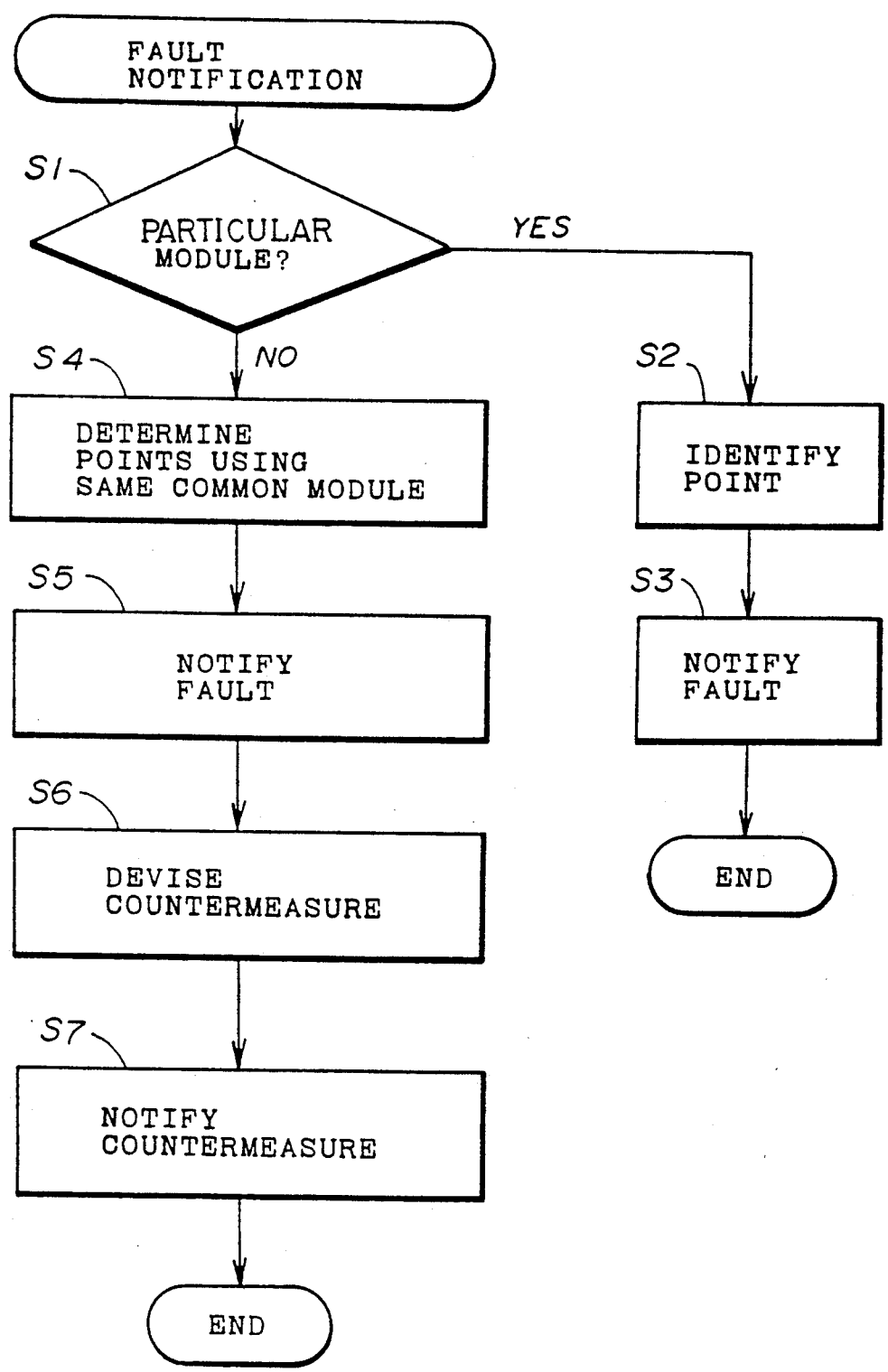
FIG. 6 is a flow chart for explaining the general operation of the embodiment of the fault processing system.

Next, a description will be given of the general operation of this embodiment of the fault processing system, by referring to FIG. 6. When a fault is generated in a program module at the producing point 2, a step S1 judges whether the fault is generated in a particular program module or a common program module. For example, the particular program module can be distinguished from the common program module by assigning different marks on the respective subroutines. When the judgement result in the step S1 is YES, a step S2 identifies the producing point 2 at which the fault is generated, and a step S3 notifies the fault in the particular program module to the center producing point 1 together with the identification of the producing point 2 in which the fault is generated. Although not shown in FIG. 6, the center producing point 1 in this case devises countermeasures against the notified fault and notifies the countermeasures to the particular producing point 2 so that the fault may be corrected. The countermeasures are devised by the operator of the center producing point 1 who is a technical expert, but it is of course possible to devise at least a part of the countermeasures automatically by a processing system of the center producing point 1 and let the operator make the final decision.

On the other hand, when the judgement result in the step S1 is NO, a step S4 determines which producing points 2 use the same common program module. Then, a step S5 notifies the fault in the common program module to the center producing point 1 together with identification of the producing points 2 which use the same common program module in which the fault is generated. In this case, as indicated by the steps below dotted lines in FIG.6, at the center producing point 1, a step S5 devises countermeasures against the fault, and a step S7 notifies the countermeasures to the operator of the center producing point 1 so that this operator may notify the concerned producing points 2 to correct the fault. Again, the countermeasures are devised by the operator of the center producing point 1 who is a technical expert, but it is of course possible to devise at least a part of the countermeasures automatically by a processing system of the center producing point 1 and let the operator make the final decision.

Further, the present invention is not limited to these embodiments, but various variations and modifications may be made without departing from the scope of the present invention.

What is claimed is:

1. A fault processing system for processing a fault which is generated in at least one of a plurality of producing points which design and produce products according to orders received from customers, said fault processing system comprising:
   a first producing point which is used as a center producing point;
   second producing points; and
   at least one communication network coupling said first and second producing points,
   each producing point including transmission and reception means respectively connected to said communication network;
   each of said second producing points comprising:
   first means for detecting a fault generated in a program module of a second producing point, and
   second means, coupled to said communication network, via respective transmission means, for notifying the fault and information identifying program module in which the fault is generated to said first producing point responsive to said first means;
   said first producing point comprising:
   a third means, coupled to said communication network, via respective transmission means, for analyzing the fault notified from said second producing point depending on whether the program module in which the fault is generated is a common program module or a particular program module based on said information, said common program module being used in common at a plurality of second producing points, said part-icular program module being used exclusively in the second producing point to which the particular program belongs,
   said third means of said first producing point including a fault diagnosis table storing with respect to each program module an operating point code specifying a producing point where the program module is operating, so that the fault is notified to the producing points having the common program module, based on said diagnosis table.

2. The fault processing system as claimed in claim 1, wherein said common program module is associated in a respective producing point with a structure selected from a group consisting of a production management structure, a manufacturing management structure and a marketing management structure.

3. The fault processing system as claimed in claim 1, wherein said particular program module is associated in a respective producing point with a structure selected from a group consisting of a marketing management structure, an accounting system and a purchasing system.

4. The fault processing system as claimed in claim 1, wherein each program module includes a fault supervision program and said first means of each of said second producing points includes means for notifying the generation of the fault in the program module to the fault supervision program of the program module, said fault supervision program notifying the generation of the fault to said second means.

5. The failure processing system as claimed in claim 1, wherein said third means further includes a general fault diagnosis structure, said diagnosis table further storing with respect to each program module a program module name, a summary of the program module, and a program module classification, said module classification specifying whether the program module is a common program module or a particular program module, said general fault diagnosis structure sorting the faults received from the producing points, depending on said information, into faults which must be dealt with in common for a plurality of producing points and faults which must be dealt with individually for each producing point by referring to said fault diagnosis table.

6. The fault processing system as claimed in claim 1, wherein said first producing point further comprises fourth means, coupled to said third means, for devising a countermeasure for the fault depending on whether the fault is generated in a common program module or a particular program module.

7. The fault processing system as claimed in claim 6, wherein said fourth means further includes means for independently notifying the countermeasure for the fault which is generated in the common program module to the center producing point and means for independently notifying the countermeasure for the fault which is generated in the particular program module to the second producing point which uses this particular program.

8. The fault processing system as claimed in claim 1, wherein said first producing point further includes a first video conference system and at least one of said second product points further includes a second video conference system, so that a video conference between the first and second video conference systems is possible via the communication network.

* * * * *